(12) United States Patent
Friedman (10) Patent No.: US 9,877,075 B2
(45) Date of Patent: Jan. 23, 2018

(54) SYSTEMS AND METHODS FOR CONTROLLING MEDIA RECORDING DEVICES VIA A MEDIA RECORDER PROXY DEVICE

(71) Applicant: AT&T INTELLECTUAL PROPERTY I, L.P., Atlanta, GA (US)

(72) Inventor: Lee Friedman, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/212,679

(22) Filed: Jul. 18, 2016

(65) Prior Publication Data
US 2016/0330520 A1 Nov. 10, 2016

Related U.S. Application Data

(63) Continuation of application No. 14/735,310, filed on Jun. 10, 2015, now Pat. No. 9,445,153, which is a continuation of application No. 12/638,366, filed on Dec. 15, 2009, now Pat. No. 9,083,934.

(51) Int. Cl.
| | |
|---|---|
| *H04N 5/765* | (2006.01) |
| *H04N 21/458* | (2011.01) |
| *H04N 5/782* | (2006.01) |
| *H04N 21/4147* | (2011.01) |
| *H04N 21/41* | (2011.01) |
| *H04N 21/433* | (2011.01) |
| *H04N 21/4335* | (2011.01) |
| *H04N 21/436* | (2011.01) |
| *H04N 21/45* | (2011.01) |
| *H04N 21/4627* | (2011.01) |

(Continued)

(52) U.S. Cl.
CPC ........ *H04N 21/4583* (2013.01); *H04N 5/765* (2013.01); *H04N 5/782* (2013.01); *H04N 21/4126* (2013.01); *H04N 21/4147* (2013.01); *H04N 21/4334* (2013.01); *H04N 21/4335* (2013.01); *H04N 21/43622* (2013.01); *H04N 21/4532* (2013.01); *H04N 21/4627* (2013.01); *H04N 21/47214* (2013.01); *H04N 9/8042* (2013.01)

(58) Field of Classification Search
None
See application file for complete search history.

(56) References Cited

U.S. PATENT DOCUMENTS

| | | |
|---|---|---|
| 7,912,902 B2 | 3/2011 | Cheng et al. |
| 8,112,449 B2 | 2/2012 | Casey et al. |
| 8,208,786 B2 | 6/2012 | Tan et al. |

(Continued)

*Primary Examiner* — Eileen Adams
(74) *Attorney, Agent, or Firm* — Toler Law Group, PC (57) ABSTRACT

A method includes receiving data from a communication device at a processor of a proxy device, the data requesting a recording of media content. The method includes, sending a first command to a first media recording device and a second command to a second media recording device. The first command instructs the first media recording device to generate a first recording based on the media content, and the second command instructs the second media recording device to generate a second recording based on the media content. The first recording has a first file format and the second recording has a second file format. The second file format is compatible with a portable device.

20 Claims, 7 Drawing Sheets

(51) Int. Cl.
*H04N 21/472* (2011.01)
*H04N 9/804* (2006.01)

(56) References Cited

U.S. PATENT DOCUMENTS

| | | | |
|---|---|---|---|
| 9,083,934 B2* | 7/2015 | Friedman | H04N 5/765 |
| 9,445,153 B2* | 9/2016 | Friedman | H04N 5/765 |
| 2006/0002256 A1 | 1/2006 | Kamio | |
| 2007/0192584 A1* | 8/2007 | Bajar | H04L 63/0428 |
| | | | 713/150 |
| 2007/0248326 A1 | 10/2007 | Khan et al. | |
| 2008/0134239 A1* | 6/2008 | Knowles | H04N 5/44543 |
| | | | 725/39 |
| 2008/0212940 A1* | 9/2008 | Tan | H04N 5/775 |
| | | | 386/231 |
| 2009/0324201 A1* | 12/2009 | Sakai | H04N 9/8205 |
| | | | 386/281 |

* cited by examiner

SYSTEMS AND METHODS FOR CONTROLLING MEDIA RECORDING DEVICES VIA A MEDIA RECORDER PROXY DEVICE

CLAIM OF PRIORITY

The present application is a continuation of and claims priority from U.S. patent application Ser. No. 14/735,310, filed on Jun. 10, 2015, and entitled "SYSTEMS AND METHODS FOR CONTROLLING MEDIA RECORDING DEVICES VIA A MEDIA RECORDER PROXY DEVICE," which is a continuation of U.S. patent application Ser. No. 12/638,366, filed on Dec. 15, 2009, now issued as U.S. Pat. No. 9,083,934, and entitled "SYSTEMS AND METHODS FOR CONTROLLING MEDIA RECORDING DEVICES VIA A MEDIA RECORDER PROXY DEVICE," the contents of which are expressly incorporated herein by reference in their entirety.

FIELD OF THE DISCLOSURE

The present disclosure is generally related to controlling media recording devices via a media recorder proxy device.

BACKGROUND

Media recording devices, such as a digital video recorder (DVR), provide access to and control over media content. Such media recording devices may be used to record media content, pause media content, fast forward media content, replay media content, and provide other functions that enable a user of the media recording device to control the time and manner in which media content is presented to the user. Service providers often desire to make content available to users having multiple devices. Controlling the operation of multiple media recording devices can require a great deal of user attention and oversight, thereby causing the management of multiple media recording devices to become a labor intensive and time consuming endeavor.

DETAILED DESCRIPTION

Systems and methods for controlling media recording devices via a proxy control device are disclosed. The media recording devices may be embodied as a set top box (STB), a mobile device, a personal computer, or other device capable of storing media content and presenting the media content to a user. For example, a particular media recording device may include a mobile device with a media player that is capable of storing media content and displaying the stored media content via the media player of the mobile device.

The proxy control device may be embodied as a server in a content delivery network. The proxy control device may operate to control a plurality of media recording devices. For example, the proxy control device may send commands to a plurality of media recording devices instructing each media recording device to record media content identified in the command. The commands may further specify a particular file format for storing the media content. For example, the proxy control device may send a command to a mobile device instructing the mobile device to record media content, such as a television episode, in a particular format supported by the mobile device. Because a single proxy control device may control multiple media recording devices, a user may record media content at multiple media recording devices with a single command directed to the proxy control device.

Further, the systems and methods may enable a user to record media content at a plurality of media recording devices using different file formats. For example, a particular media recording device may record media content in a particular file format that is supported by the particular media recording device so that media content may be delivered to a user via the particular media recording device. Because media content can be recorded at a plurality of media recording devices, including portable media recording devices, the systems and methods therefore may enable a user to access recorded content via a plurality of media recording devices, including portable media recording devices.

In a first particular embodiment, a media recorder proxy device is disclosed that includes a processor, a memory coupled to the processor, a network interface, and a proxy module. The proxy module is configured to receive, via the network interface, a first command to record media content at a first media recording device. The proxy module is further configured to send, via the network interface, a second command to the first media recording device to record the media content in a first file format. The proxy module is also configured to send, via the network interface, a third command to a second media recording device to record the media content in a second file format that is different than the first file format and is compatible with a portable device. Because the second media recording device may be a portable device, the media content recorded at the second media recording device, which is recorded in a format compatible with a portable device, may be accessed at any location due to the portable nature of the second media recording device.

In a second particular embodiment, a computer-implemented method includes receiving data at a proxy device specifying a first command to record media content at a first media recording device. The method further includes sending a second command from the proxy device to the first media recording device to record the media content. In response to the second command, the first media recording device records the media content in a first file format. The method also includes sending a third command from the proxy device to a second media recording device to record the media content. In response to the third command, the second media recording device records the media content in a second file format that is different than the first file format and that is compatible with a portable device.

In a third particular embodiment, a computer-readable storage medium is disclosed. The computer-readable storage medium includes operational instructions that, when executed by a processor, cause the processor to receive at a proxy device a first command to record media content at a first media recording device. The computer-readable storage medium also includes operational instructions that, when executed by the processor, cause the processor to send a command to schedule a recording of the media content in a first file format at the first media recording device. The computer-readable storage medium includes operational instructions that, when executed by a processor, cause the processor to send a command to schedule a recording of the media content at a second media recording device. The media content is recorded in a second file format that is different than the first file format.

Figure 1:
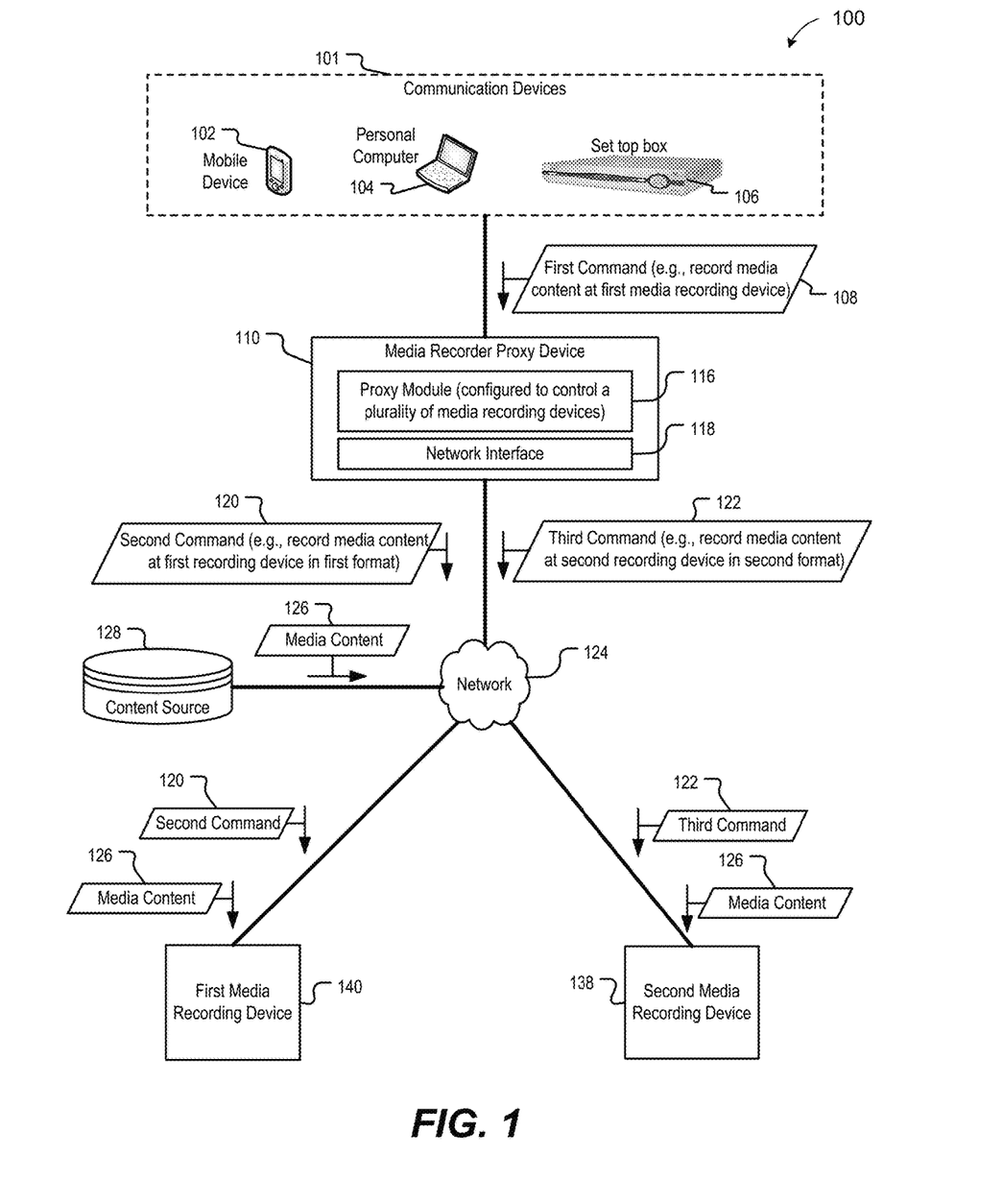
FIG. 1 is a block diagram of a first particular embodiment of a system to control media recording devices via a media recorder proxy device.

Referring to FIG. 1, a system 100 is illustrated. The system 100 includes communications devices 101, such as a mobile device 102, a personal computer 104, and a set top box (STB) 106. The system 100 further includes a first media recording device 140, a second media recording device 142, a content source 128, a network 124, and a media recorder proxy device 110. The media recorder proxy device 110 includes a proxy module 116 and a network interface 118. Although the depicted system 100 only includes a first media recording device 140 and a second media recording device 142, more than two media recording devices may be included in or accessible to the system 100. The depicted system 100 includes only two representative media recording devices 140 and 142 for ease of explanation, not to limit the scope of the present application.

The first media recording device 140 and the second media recording device 142 are coupled to a data communication network, such as the network 124. The first media recording device 140 and the second media recording device 142 may be configured to communicate with the content source 128 and the media recorder proxy device 110 via the network 124. The first media recording device 140 and the second media recording device 142 may be configured to record media content 126 received from the content source 128 via the network 124. The first media recording device 140 and the second media recording device 142 may record the media content 126 by storing the media content 126 in memory (not shown) of each media recording device 140 and 142. The media content 126 may be recorded at the first media recording device 140 by storing the media content 126 in a first file format. The media content 126 may be recorded at the second media recording device 142 by storing the media content 126 in a second file format that is different from the first file format. The second file format is compatible with a portable device, such as the mobile device 102 or the personal computer 104. For example, the media recording devices 140 and 142 may be embodied as a digital video recorder (DVR) residing in a STB, a network DVR, a mobile telephone, a personal computer, a portable media player, or any combination thereof. The media content 126 may be an audio/video file stored as a Microsoft™ Digital Video Recording (DVR-MS) file, a Moving Picture Experts Group (MPEG) file, an Audio/Video Interleave (AVI) file, a Third Generation Partnership Project (3GPP) file (3GP and 3G2 file format), among other file formats supported by media recording devices.

The content source 128 may be a repository for media content. For example, the content source 128 may be embodied as a video-on-demand server, a cable television headend, a file sharing database, a network element in a satellite television system, a network element in an internet protocol television (IPTV) system, or any combination thereof. The content source 128 may be communicatively coupled to the first media recording device 140 and to the second media recording device 142 via the network 124. The content source 128 may therefore be capable of transmitting media content 126 to the media recording devices 140 and 142 via the network 124.

During operation, the media recorder proxy device 110 may receive a first command 108 via the network interface 118. The first command 108 may include an instruction to record media content, such as the media content 126, at the first media recording device 140. The first command 108 may include information identifying the media content 126 to be recorded and may include an identification of a device for recording the media content 126. As an example, the first command 108 may be received from the mobile device 102, the personal computer 104, the STB 106, or from another communication device accessible to a user.

In response to receiving the first command 108, the proxy module 116 may be configured to send a second command 120 to the first media recording device 140 via the network interface 118. The second command 120 may include an instruction to record the media content 126 at the first media recording device 140 in a first file format. The first file format may be determined based on a device profile of the first media recording device 140, based on input received from a user as specified in the first command 108, or any combination thereof. The device profile may include information contained in a previous command to record media content at the first media recording device 140. For example, if a command was issued from one of the communication devices 101 to record media content as an MPEG file at the first media recording device 140, the proxy module may be configured to create a device profile for the first media recording device 140 indicating that the MPEG file format is to be used as a default file format for content recorded at the first media recording device 140. As such, all media content subsequently recorded at the first media recording device 140 may be recorded as an MPEG file unless a particular command to record the media content at the first media recording device 140 indicates that another file format is to be used.

In further response to receiving the first command 108, the proxy module 116 may also be configured to send a third command 122 to the second media recording device 142 via the network interface 118. The third command 122 may include an instruction to record the media content 126 at the second media recording device 142 in a second file format. The second file format may be determined based on a device profile of the second media recording device 142, based on input received from a user as specified in the first command 108, or any combination thereof.

The second command 120 and the third command 122 may be sent from the media recorder proxy device 110 via the network interface 118. The network interface 118 may be configured for data communications via the network 124. Although the depicted system 100 only includes a single network 124, the system 100 may include more than one network such as a packet-based data communications network, a cellular network, a television system, or any combination thereof. Likewise, the media recorder proxy device 110 may include more than one network interface configured for data communications with each network. Since the media recorder proxy device 110 may communicate via a plurality of networks, the media recorder proxy device 110 may communicate with many types of media recording devices. For example, the media recorder proxy device 110 may communicate with a DVR via a television system, such as an IPTV system, and also may communicate with a mobile device via a packet-based data communications network or a wireless network.

In response to receiving the second command 120 from the media recorder proxy device 110, the first media recording device 140 may be configured to record the media content 126 at the first media recording device 140. Recording the media content 126 may be carried out, for example, by storing the media content 126 in a memory accessible to the first media recording device 140. In one illustrative embodiment, the media content 126 may be received from the content source 128 based on a request (not shown) sent from the first media recording device 140. For example, the first media recording device 140 may be configured to communicate via a packet-based data communications network and may request the media content 126 by sending a request identifying a particular file for downloading to a file server that can send files in accordance with the File Transfer Protocol (FTP). Alternatively, the media content 126 may be received via a broadcast stream received at the first media recording device 140. For example, the first media recording device 140 may be configured to receive data communications via a television system and may receive the media content 126 via a broadcast signal received from the television system.

The media content 126 may be recorded in a first file format that is a default file format for content recorded at the first media recording device 140 or the media content 126 may be recorded in the first file format based on information in the second command 120 that specifies the first file format. For example, the second command 120 may include metadata indicating that the media content 126 should be stored in a particular file format. Recording the media content 126 in the first file format may be carried out, for example, by receiving the media content 126 in the first file format. Alternatively, recording the media content 126 in the second file format may be carried out by converting the media content 126 into the first file format from a different file format. For example, the first media recording device 140 may have a media content conversion application installed such that the first media recording device 140 is capable of converting media content in a first file format to media content in a second file format. For example, the media recording device 140 may include an application such as HandBrake, FormatFactory, or other proprietary application or logic capable of converting media content from a first file format to a second file format.

In response to receiving the third command 122 from the media recorder proxy device 110, the second media recording device 142 may be configured to record the media content 126 at the second media recording device 142. The media content 126 may be recorded in a second file format that is a default file format for content recorded at the second media recording device 142 or the media content 126 may be recorded in the second file format based on information in the third command 122 that specifies the second file format. For example, the third command 122 may include metadata indicating that the media content 126 should be stored in a particular file format. Recording the media content 126 in the second file format may be carried out, for example, by receiving the media content 126 in the second file format. Alternatively, recording the media content 126 in the second file format may also be carried out by converting the media content 126 into the second file format from a different file format. For example, the second media recording device 142 may have a media content conversion application installed such that the second media recording device 142 is capable of converting media content in a first file format to media content in a second file format.

In an example embodiment, the second media recording device 142 may be embodied as a mobile device configured to send and receive data communications via a third generation (3G) network. The mobile device may include a display. The mobile device may be capable of playing audio/video files encoded in a particular file format, such as AVI, via a media player installed at the mobile device. In such an embodiment, the second media recording device 142 may receive a command from the media recorder proxy device 110 to record media content via the 3G network. The second media recording device 142 may subsequently send a request to download a particular AVI file from a content source, such as a file server. In response to the request, the second media recording device 142 may download the particular AVI file from the file server and store the AVI file in a memory of the mobile device. The AVI file may subsequently be played at the mobile device using the media player and displayed via the display of the mobile device.

The system 100 therefore enables a user to record media content at multiple media recording devices with a single command (e.g., the first command 108). Further, because the media content is recorded at multiple media recording devices in two different file formats, the media content can be viewed at multiple devices, including a portable device. As such, a user may watch recorded content at a designated user location, such as a user's home, or at any other location. For example, when the first media recording device is a DVR at a STB of the user and the second media recording device is a mobile device of the user, the user may view the recorded content at the user's home via the STB or may view the recorded content at another location via the mobile device.

Figure 2:
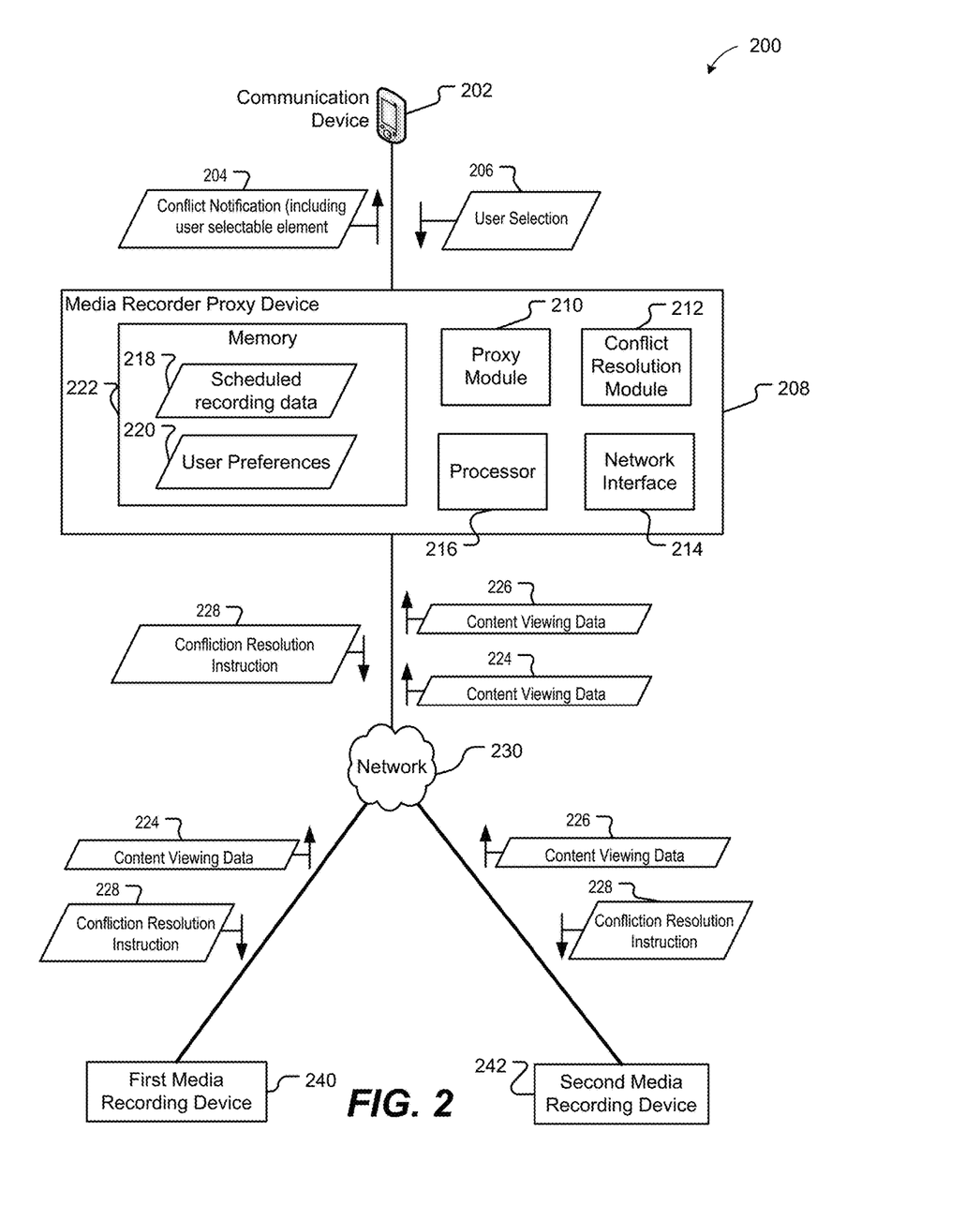
FIG. 2 is a block diagram of a second particular embodiment of a system to control media recording devices via a media recorder proxy device.

Referring to FIG. 2, a system 200 is illustrated. The system 200 includes a first media recording device 240, a second media recording device 242, a communication device 202, and a media recorder proxy device 208. The first media recording device 240 and the second media recording device 242 may be coupled to a data communication network, such as the network 230. Each media recording device 240 and 242 may be configured to communicate with the media recorder proxy device 208 via the network 230.

The media recorder proxy device 208 may include a memory 222, a proxy module 210, a processor 216, a conflict resolution module 212, and a network interface 214. The media recorder proxy device 208 may further be located at a remote location relative to the first media recording device 240 and the second media recording device 242. The memory 222 may include various user preferences 220 and scheduled recording data 218 to identify scheduled recordings for each media recording device 240 and 242.

During operation, each media recording device 240 and 242 may be configured to receive media content from a content source (not shown) via the network 230. The media content may be received from the content source for recording at either or both of the media recording devices 240 and 242. For example, a command to record media content, such as the command 108 of FIG. 1, may result in a plurality of scheduled recordings at the first media recording device 240 and at the second media recording device 242. The scheduled recordings may be based on information stored in an electronic program guide (EPG). The EPG may include metadata identifying a particular source for requested content, such as a television channel, an indication of the time that the requested content may be available, a format of the requested content, or any combination thereof.

Information related to the scheduled recordings may be extracted from the EPG and stored in the memory 222 of the media recorder proxy device 208 as scheduled recording data 218. The media recorder proxy device 208 may utilize the scheduled recording data 218 to initiate the recording of media content at either media recording device 240 and 242. For example, the media recorder proxy device 208 may issue a command (e.g., similar to the second command 120 of FIG. 1) instructing the first media recording device 240 to record media content. Likewise, the media recorder proxy device 208 may issue a command (e.g., similar to the third command 122 of FIG. 1) instructing the second media recording device 242 to record media content.

In addition to recording media content, each media recording device 240 and 242 may receive media content from the content source (not shown) for display via either of the media recording devices 240 and 242. The media content may be displayed via a display that is included as part of either media recording device 240 and 242. Alternatively, the media content may be displayed via a separate display device that is coupled to either media recording device 240 and 242. Each media recording device 240 and 242 can communicate information identifying specific media content that is being displayed via each media recording device 240 and 242 by transmitting content viewing data 224 and 226 to the media recorder proxy device 208. The content viewing data 224 and 226 may include information identifying the source of media content being displayed via a particular media recording device 240 and 242, such as a particular television channel associated with media content being displayed via a particular media recording device 240 and 242.

Since there may be multiple scheduled recordings at a particular media recording device 240 and 242 and since media content may be delivered to the particular media recording device 240 and 242 for display, the particular media recording device 240 and 242 may be expected to either record or display multiple streams of media content at a particular time. In some instances, the number of streams of media content to be recorded and displayed via the particular media recording device 240 and 242 may exceed the number of streams of media content that the particular media recording device 240 and 242 is capable of receiving or processing. In such instances, the media recorder proxy device 208 may be configured to detect and resolve conflicts via the conflict resolution module 212.

The conflict resolution module 212 may be configured to determine whether a first scheduling conflict exists between a scheduled recording of media content at the first media recording device 240 and a viewing of other media content at the first media recording device 240. The conflict resolution module 212 may be further configured to determine whether a second scheduling conflict exists between a scheduled recording of media content at the second media recording device 242 and a viewing of other media content at the first media recording device 242. For example, the first media recording device 240 may be capable of receiving two media streams simultaneously. The conflict resolution module 212 may utilize the scheduled recording data 218 to determine that two media streams, such as two television programs, are scheduled for recording at the first media recording device 240 at a particular time. In addition, the conflict resolution module 212 may receive content viewing data 224 from the first media recording device 240 indicating that a third media stream is being received for display via the first media recording device 240. In such an example, because the first media recording device 240 is scheduled to receive more media streams (3 media streams) than the first media recording device 240 is capable of receiving (2 media streams), the conflict resolution module 212 may take action to remedy the scheduling conflict.

In a particular embodiment, the conflict resolution module 212 may be configured to send a conflict notification 204 to the communication device 202 via the network interface 214. The conflict notification 204 may include information descriptive of the scheduling conflict. For example, the conflict notification 204 may indicate at what time the conflict will occur, which media streams are in conflict, which media recording device is experiencing the conflict, or any combination thereof.

In another particular embodiment, the conflict notification 204 further includes one or more user selectable actions for resolving the scheduling conflict. In such an embodiment, the conflict resolution module 212 may be configured to generate an instruction 228 for resolving the scheduling conflict based on a user selection 206. For example, the conflict notification 204 may present an option to a user enabling the user to resolve a scheduling conflict by selecting one or more scheduled recordings to be cancelled. The user may subsequently make a user selection 206 specifying a particular scheduled recording to cancel. Upon receipt of the user selection 206, the conflict resolution module 212 may generate an instruction 228 for resolving the conflict and may send the instruction 228 to each media recording device 240 and 242 via the network interface 214. For example, the instruction 228 may include an instruction to cease recording specified media content at a particular media recording device 240 and 242.

In another particular embodiment, the conflict resolution module 212 may be configured to generate an instruction 228 for resolving a scheduling conflict based on one or more user preferences 220. For example, the user preferences 220 may include a priority for each scheduled recording at a particular media recording device 240 and 242. The conflict resolution module 212 may therefore be configured to issue an instruction 228 to cancel a scheduled recording with the lowest priority.

The system 200 may therefore enable scheduling conflicts to be resolved with or without user interaction. Users may be able to decide how to handle scheduling conflicts on a case-by-case basis. Further, users may be able to have scheduling conflicts resolved in a predetermined manner when the user is unwilling or unable to respond to a conflict notification.

Figure 3:
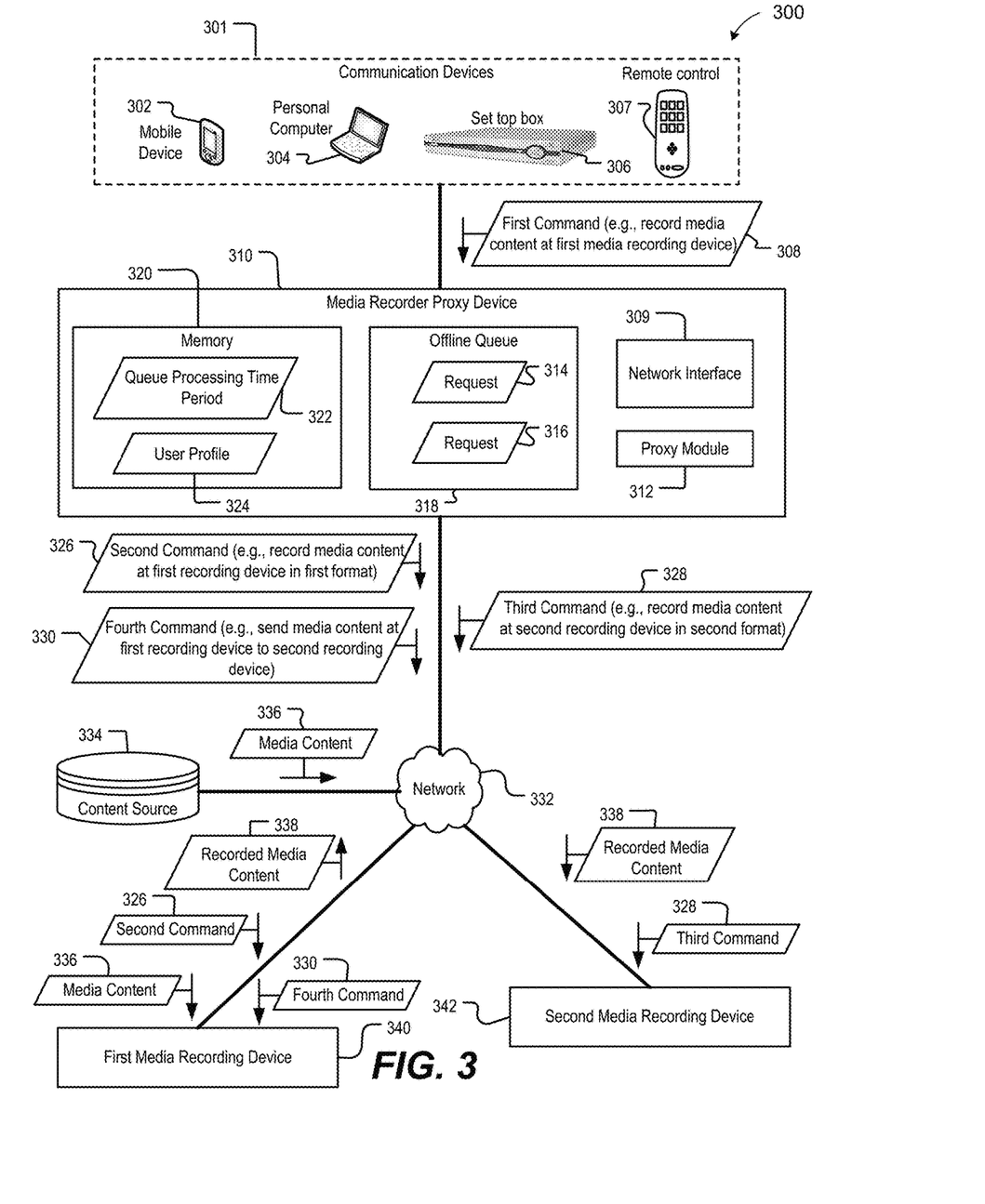
FIG. 3 is a block diagram of a third particular embodiment of a system to control media recording devices via a media recorder proxy device.

Referring to FIG. 3, a system 300 is illustrated. The system 300 includes communication devices 301, such as a mobile device 302, a personal computer 304, a STB 306, and a remote control device 307. The system 300 further includes a first media recording device 340, a second media recording device 342, a content source 334, a network 332, and a media recorder proxy device 310. The media recorder proxy device 310 includes a network interface 309, a proxy module 312, a memory 320, and an offline queue 318. The offline queue 318 may include one or more requests 314 to 316 to record media content.

During operation, the media recorder proxy device 310 may receive a first command 308 via the network interface 309. The first command 308 may include an instruction to record media content, such as the media content 336, at the first media recording device 340, at the second media recording device 342, or at another device. For example, the first command 308 may be received from the mobile device 302, the personal computer 304, the STB 306, or the remote control device 307.

In a particular embodiment, the first command 308 may be received from the remote control device 307 via an infrared receiver located at the second media recording device 342. The infrared receiver at the second media recorder device 342 may receive a series of light pulses from a light-emitting diode (LED) of the remote control device. The infrared receiver may subsequently identify a digital signal, such as a bit pattern, represented by the series of light pulses. The second media recording device 342 may send the bit pattern to the media recorder proxy device 310 via the network 332. Upon receipt of the bit pattern, the media recorder proxy device 310 may use the bit pattern to identify a function that can be performed at one of the media recording devices 340 and 342. For example, the media recorder proxy device 310 may include data stored in the memory 322 of the media recorder proxy device 310 that maps functions that may be performed by the media device recording devices 340 and 342 to codes transmittable by the remote control device 307. The first command 308 may therefore be transmitted by the remote control device 307 when a series of light pulses emitted from the remote control device indicates that the remote control device is issuing a request to record media content at the first media recording device 340.

In response to receiving the first command 308, the proxy module 312 may be configured to send a second command 326 to the first media recording device 340 via the network interface 309. The second command 326 may include an instruction to record the media content 336 at the first media recording device 340 in a first file format. In further response to receiving the first command 308, the proxy module 312 may also be configured to send a third command 328 to the second media recording device 342. The third command 328 may include an instruction to record the media content 336 at the second media recording device 342 in a second file format.

In response to receiving the second command 326 from the media recorder proxy device 310, the first media recording device 340 may be configured to schedule a recording of the media content 336 at the first media recording device 340. The first media recording device 340 may be configured to record the media content 336 in a first file format. In response to receiving the third command 328 from the media recorder proxy device 310, the second media recording device 342 may attempt to record the media content 336 in a second file format. The second file format may be compatible with a portable device, such as the mobile device 302. The second file format may be determined based on an attribute of the second media recording device 342, such as the file formats that the second media recording device 342 is capable of processing, or based on information contained in a user profile 324 stored in the memory 320 of the media recorder proxy device 310.

In a particular embodiment, the proxy module 312 is configured to determine whether the second media recording device 342 is able to access the media content 336 at a particular time. If the second media recording device 342 is unable to access the media content 336, the proxy module 312 may add the requests 314 and 316 to the offline queue 318. The requests 314 and 316 may represent instructions to record the media content 336 at a later time. The proxy module 312 may be configured to process one or more of the requests 314 and 316 in the offline queue 318 during an offline queue processing time period 322. The offline queue processing time period 322 may be specified by a user or otherwise determined by the media recorder proxy device 310. For example, any time that the second media recording device 342 is not accessing media content, the media recorder proxy device 310 may process requests 314 and 316 in the offline queue 318. In a particular embodiment, the proxy module 312 may process the requests 314 and 316 by sending, via the network interface 309, a fourth command 330 to the first media recording device 340 instructing the first media recording device 340 to send media content 338 recorded at the first media recording device 340 to the second media recording device 342. The recorded media content 338 may include the media content 336 that could not be accessed by the second media recording device 342. The recorded media content 338 may be communicated from the first media recording device 340 to the second media recording device 342 via the network 332. The recorded media content 338 may be recorded and stored at the second media recording device 324.

In a particular embodiment, the media recorder proxy device 310 may also issue a first deletion command to the first media recording device 340 to delete media content stored at the first media recording device 340. Likewise, the media recorder proxy device 310 may also issue a second deletion command to the second media recording device 342 to delete media content stored at the second media recording device 342. The first deletion command and the second deletion command may be issued such that media content stored at the first media recording device 340 and media content stored at the second media recording device 342 are deleted simultaneously or near simultaneously.

For example, the media recorder proxy device 310 may impose a limit on the amount of media content items that may be recorded at the first media recording device 340 and recorded at the second media recording device 342. When the first media recording device 340 and the second media recording device 342 have reached their limit, the media recorder proxy device 310 may issue a first deletion command to the first media recording device 340 and a second deletion command to the second media recording device 342 in response to receiving a first command 308 at the media recorder proxy device 310. By issuing the deletion commands before issuing the second command 326 and the third command 328, the media recorder proxy device 310 may send commands such that a media content item is deleted from each of the media recording devices 340 and 342 before another media content item is recorded at each of the media recording devices 340 and 342 so that neither of the media recording devices 340 and 342 stores media content items in excess of their limit.

In a particular embodiment, the second media recording device 342 may be embodied as a single device configured to operate as a DVR and as a media server. The media recording device may record the media content 336 and distribute the media content 336 to one or more portable devices. For example, the second media recording device 342 may be able to record the media content 336 by storing the media content 336 in a memory at the second media recording device 342. The second media recording device 342 may also be able to communicate with one or more portable devices that are configured for communications over a data communications network. For example, the second media recording device 342 may include a wireless network interface to wirelessly transmit recorded content over a wireless network, such as the network 332, to portable devices that are also capable of wireless communications.

For example, the second media recording device 342 may wirelessly transmit recorded content to portable devices by streaming the recorded content to one or more of the portable devices, such as the mobile device 302. The recorded content may be streamed to one or more of the portable devices by transmitting the recorded content in accordance with streaming protocols such as the Real-time Streaming Protocol (RTSP), the Real-time Transport Protocol (RTP), or the Real-time Transport Control Protocol (RTCP). Alternatively, the second media recording device 342 may wirelessly transmit recorded content to portable devices by operating a file server such that recorded content may be downloaded by the one or more portable devices. For example, the mobile device 302 may be enabled to download recorded content after sending a request for the content to the second media recording device 342.

In another particular embodiment, digital rights management (DRM) content may be added to the media content 336 that is recorded at the second media recording device 342. The DRM content may be used to limit usage of media content recorded at the second media recording device 342. For example, the DRM content may be used to restrict access to the media content 336 or to prevent unauthorized copying of the media content 336 recorded at the second media recording device 342.

The system 300 may therefore enable a media recording device to access media content by receiving the media content from the content source and by receiving the media content from another media recording device. A particular media recording device may therefore have redundant sources for media content.

Figure 4:
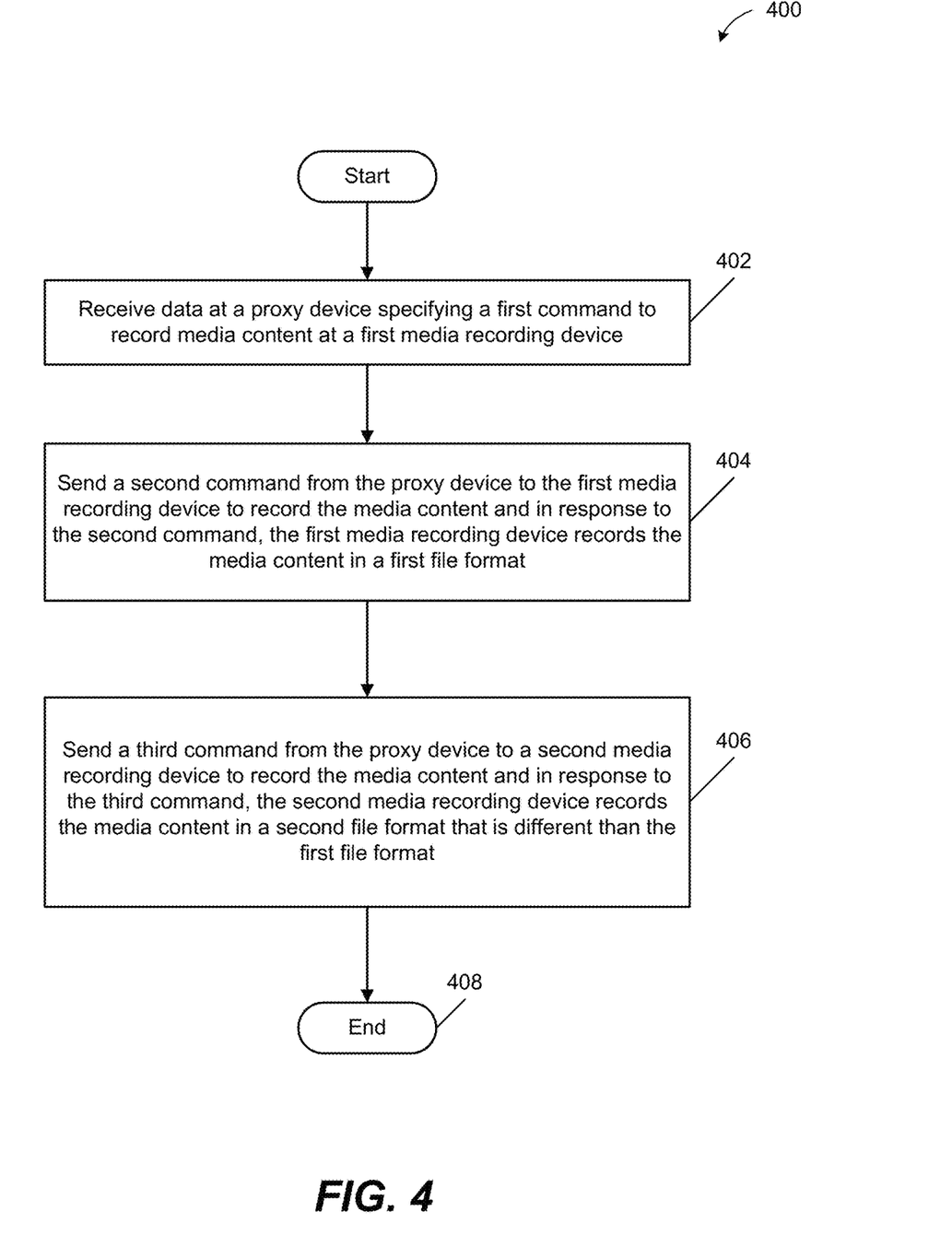
FIG. 4 is a flow diagram of a first particular embodiment of a method to control media recording devices via a media recorder proxy device.

Referring to FIG. 4, a computer-implemented method 400 is disclosed. The method 400 includes receiving data at a proxy device specifying a first command to record media content at a first media recording device, at 402. For example, in FIG. 1, the media recorder proxy device 110 receives the first command 108 to record the media content 126 at the first media recording device 140.

The method 400 further includes sending a second command from the proxy device to the first media recording device to record the media content, at 404. In response to the second command, the first media recording device may record the media content in a first file format. For example, in FIG. 1, the media recorder proxy device 110 may send the second command 120 from the media recorder proxy device 110 to the first media recording device 140 to record the media content 126. The first media recording device 140 may record the media content 126 in a first file format in response to the second command 120.

The method 400 further includes sending a third command from the proxy device to a second media recording device to record the media content, at 406. In response to the third command, the second media recording device may record the media content in a second file format that is different than the first file format. The second file format may be compatible with a portable device. For example, in FIG. 1, the media recorder proxy device 110 may send the third command 122 to the second media recording device 142. In response to the third command 122, the second media recording device 142 may record the media content 126 in a second file format that is different than the first file format. The second file format may be compatible with a portable device, such as the mobile device 102. The method terminates at 408.

The method 400 enables a user to record media content at multiple media recording devices with a single command (e.g., the first command) Further, because the media content is recorded at multiple media recording devices in different file formats, the media content can be viewed at multiple devices, including a portable device. As such, a user may watch recorded content at a designated user location, such as a user's home, or at any other location. For example, when the first media recording device is a DVR at a STB of the user, and the second media recording device is a mobile device of the user, the user may view the recorded content at the user's home via the STB or the user may view the recorded content at another location via the mobile device.

Figure 5:
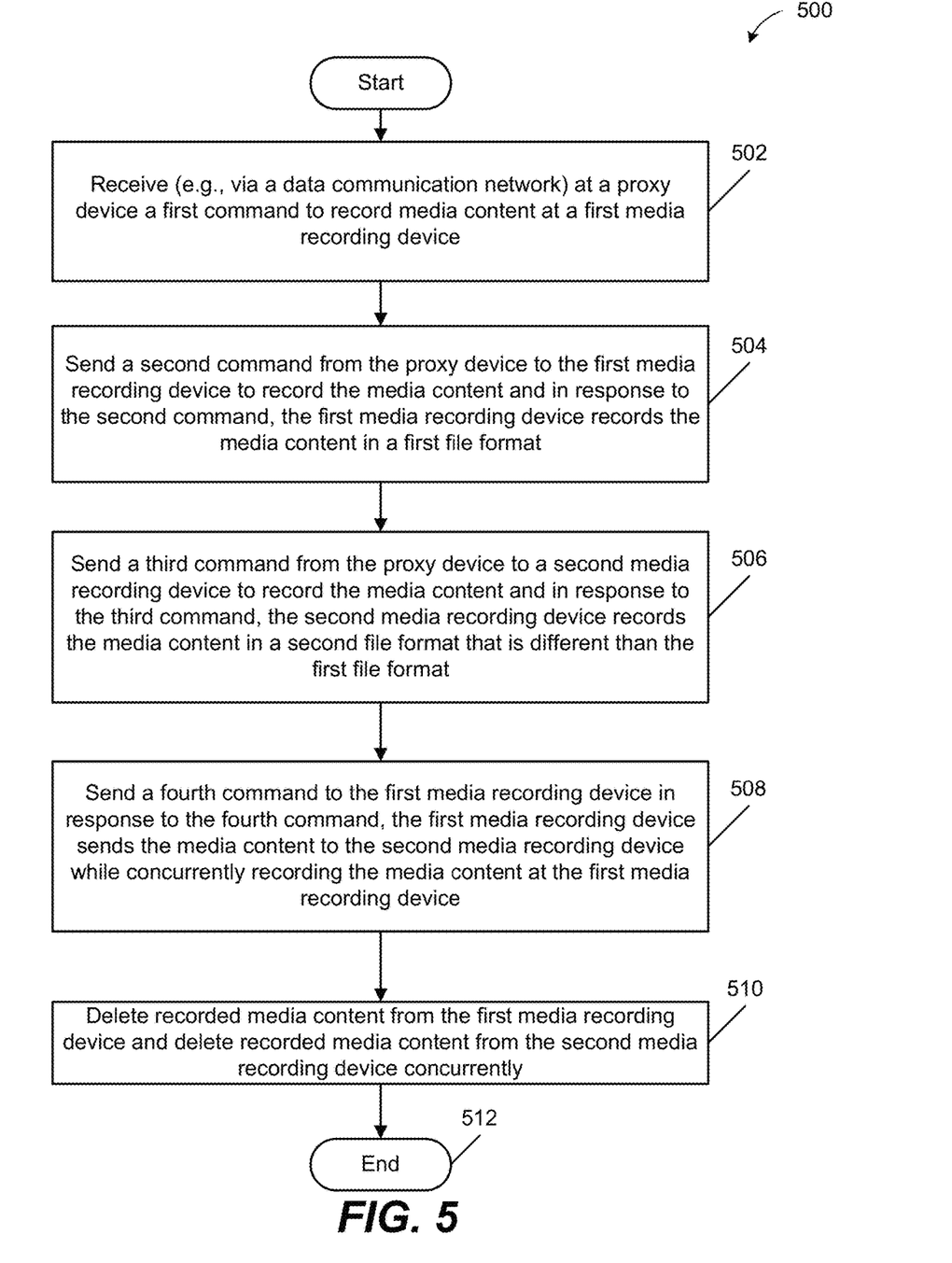
FIG. 5 is a flow diagram of a second particular embodiment of a method to control media recording devices via a media recorder proxy device.

Referring to FIG. 5, a computer-implemented method 500 is disclosed. The method 500 includes receiving a first command at a proxy device to record media content at a first media recording device, at 502. The proxy device may receive the first command via a data communication network. The command may be received from a computing device associated with the first media recording device. For example, in FIG. 3, the media recorder proxy device 310 may receive the first command 308 from one of the communication devices 301 that may be associated with the first media recording device 340. For example, a manufacturer of the first media recording device 340 may provide a remote control device for controlling the first media recording device 340. The remote control device is therefore associated with the media recording device 340 since the remote control device is preprogrammed to control operations of the first media recording device 340. Alternatively, a particular communication device, such as the mobile device 302, may be associated with the first media recording device 340 because a user of the mobile device 302 is also a user of the first media recording device 340. The user may therefore cause the first media recording device 340 to perform some function by sending a command from the mobile device 302 to the media recorder proxy device 310.

The method 500 further includes sending a second command from the proxy device to the first media recording device, at 504. In response to the second command, the first media recording device may record the media content in a first file format. For example, in FIG. 3, the media recorder proxy device 310 may send the second command 326 from the media recorder proxy device 310 to the first media recording device 340 to record the media content 336. The first media recording device 340 may record the media content 336 in a first file format in response to the second command 326.

The method 500 also includes sending a third command from the proxy device to a second media recording device to record the media content, at 506. In response to the third command, the second media recording device may record the media content in a second file format that may be different than the first file format. The second file format may compatible with a portable device. For example, in FIG. 3, the third command 328 may be sent from the media recorder proxy device 310 to the second media recording device 342. In response to the third command 328, the second media recording device 342 may record the media content 336 is a second file format that is different than the first file format and compatible with a portable device such as the mobile device 302.

The method 500 also includes sending a fourth command to the first media recording device, at 508. In response to the fourth command, the first media recording device may send the media content to the second media recording device while concurrently recording the media content at the first media recording device. For example, in FIG. 3, the fourth command 330 may be sent to the first media recording device 340. In response to the fourth command 330, the first media recording device 340 may send media content, such as the recorded media content 338, to the second media recording device 342. The first media recording device 340 may send the recorded media content 338 to the second media recording device 342 while concurrently recording media content, such as while recording the media content 336.

The method 500 further includes deleting recorded media content from the first media recording device and deleting recorded media content from the second media recording device concurrently, at 510. For example, in FIG. 3, the first media recording device 340 and the second media recording device 342 may concurrently delete media content, such as the recorded media content 338. The method terminates at 510.

Figure 6:
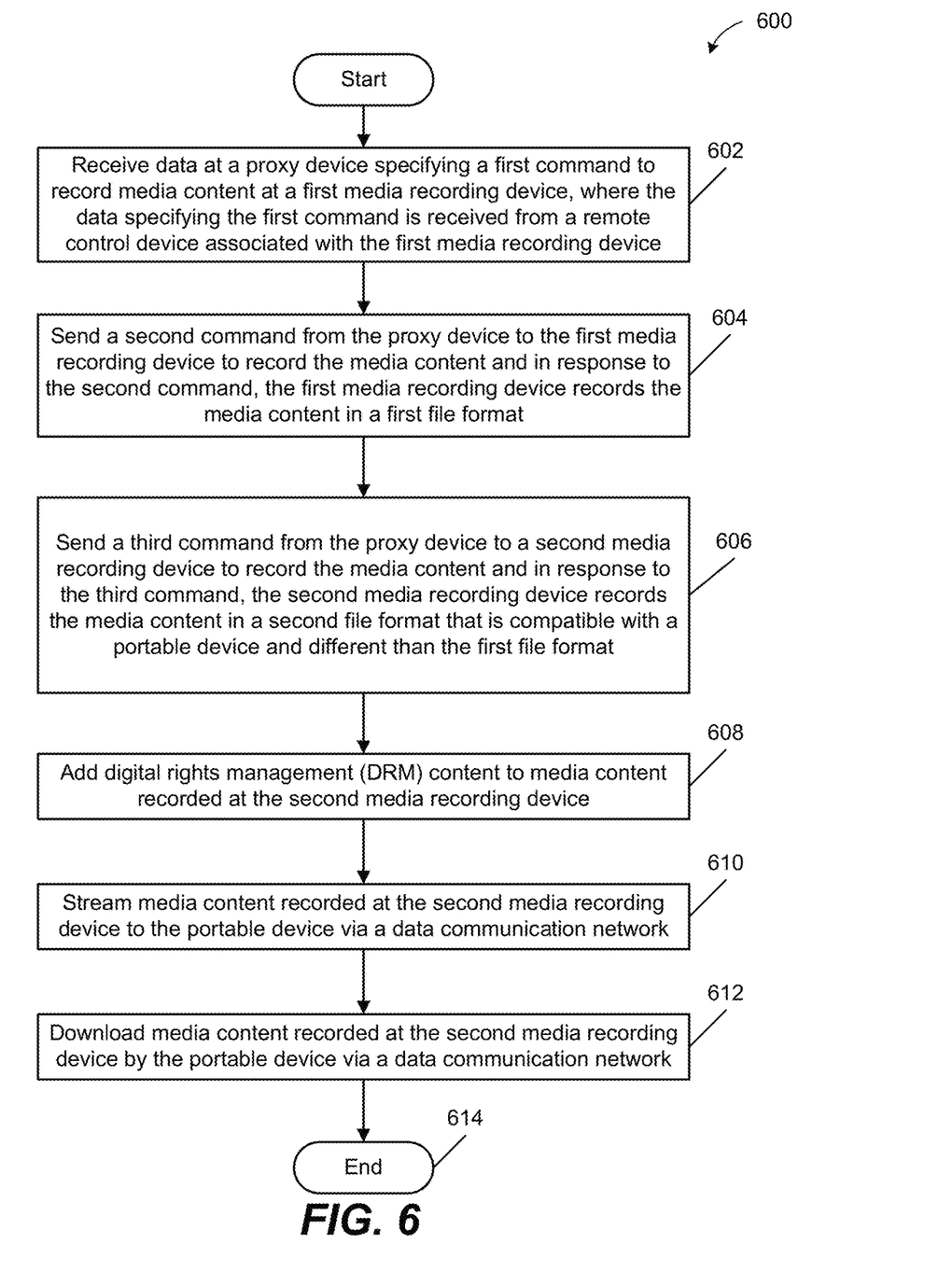
FIG. 6 is a flow diagram of a third particular embodiment of a method to control media recording devices via a media recorder proxy device.

Referring to FIG. 6, a method 600 to control media recording devices via a media recorder proxy device is disclosed. The method 600 includes receiving data at a proxy device specifying a first command to record media content at a first media recording device, at 602. The data specifying the first command may be received from a remote control device associated with the first media recording device. For example, in FIG. 3, the media recorder proxy device 310 may receive data specifying a first command, such as the first command 308, to record the media content 336 at the first media recording device 340. The first command 308 may be received from the remote control device 307 associated with the first media recording device 340. For example, the first command may be received from the remote control device 307 via an infrared receiver located at the first media recording device 340 and thereafter transferred from the first media recording device 340 to the media recorder proxy device 310 via the network 332. In another embodiment, the remote control device 307 may be configured to communicate directly with the media recorder proxy device 310. For example, the remote control device 307 may include a wireless network interface and may therefore be capable of communicating packet-based data representing the first command 308 to the media recorder proxy device 310 via a data communications network such as the network 322.

The method 600 further includes sending a second command from the proxy device to the first media recording device to record the media content, at 604. In response to the second command, the first media recording device may record the media content in a first file format. For example, in FIG. 3, the media recorder proxy device 310 may send the second command 326 to the first media recording device 340. In response to the second command 326, the first media recording device 340 may record the media content 336 in a first file format.

The method 600 also includes sending a third command from the proxy device to a second media recording device to record the media content, at 606. In response to the third command, the second media recording device may record the media content in a second file format that is different than the first file format. The second file format may be compatible with a portable device. For example, in FIG. 3, the media recorder proxy device 310 may send the third command 328 to the second media recording device 342. In response to the third command 328, the second media recording device 342 may record the media content 336 in a second file format that is different from the first file format and the second file format may be compatible with a portable device, such as the mobile device 302.

The method 600 further includes adding digital rights management (DRM) content to media content recorded at the second media recording device, at 608. The DRM content may be used to limit the usage of media content recorded at the second media recording device. For example, in FIG. 3, the media content 336 may be recorded at the second media recording device 338 and DRM content may be added to the media content 336 to restrict usage of the media content 336.

The method 600 also includes streaming media content recorded at the second media recording device to a portable media player via a data communication network, at 610. For example, in FIG. 3, media content recorded at the second media recording device 342 may be streamed to a mobile device that includes a media player, such as the mobile device 302, via the network 322.

The method 600 further includes downloading media content recorded at the second media recording device by a portable media player via a data communication network, at 612. For example, in FIG. 3, a mobile device that includes a media player, such as the mobile device 302, may download content stored at the second media recording device 342 via the network 342. The method 600 terminates at 614.

Figure 7:
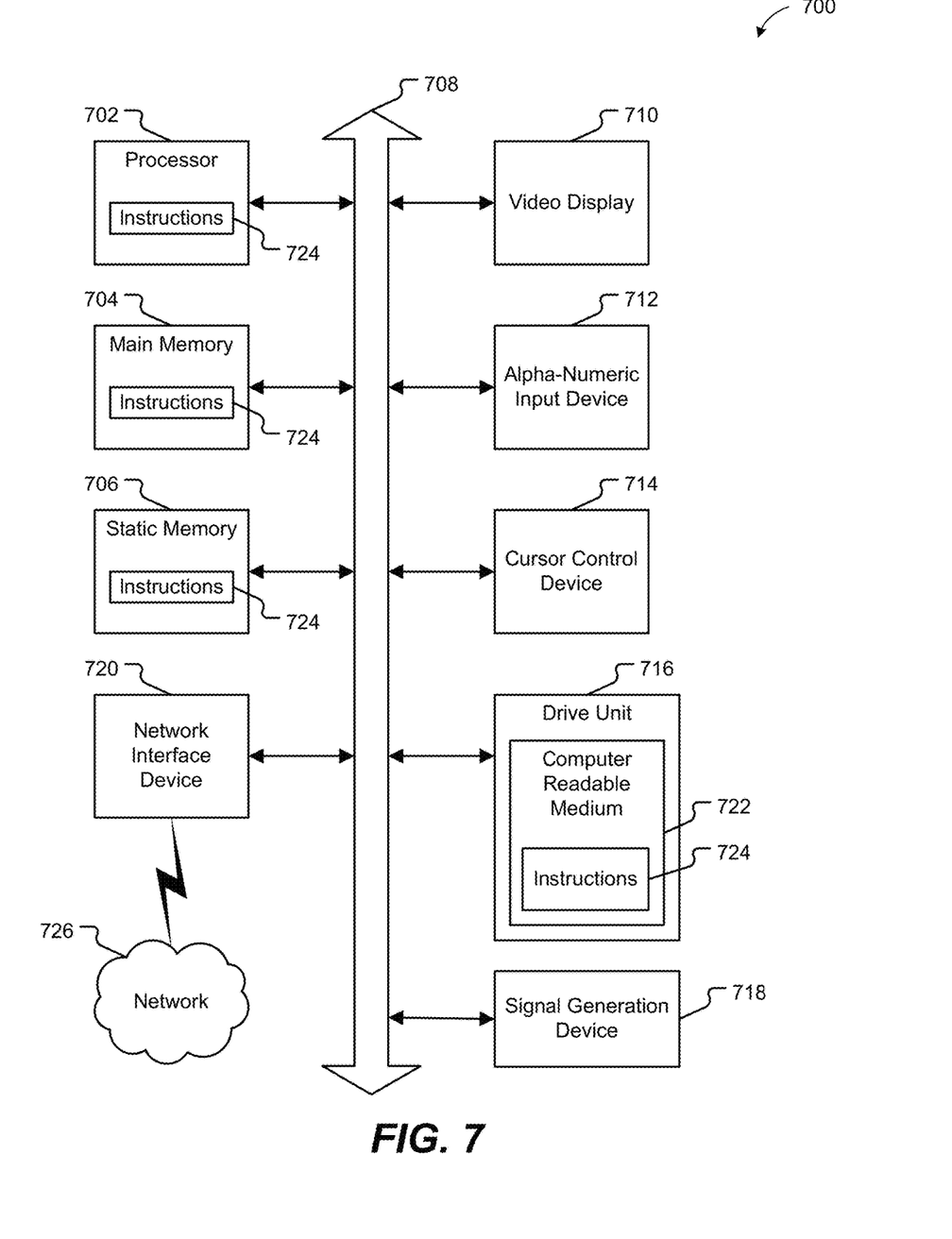
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. In an illustrative embodiment, the computer system 700 may include the media recorder proxy device 110 of FIG. 1. The media recorder proxy device 110 of FIG. 1 may include or be implemented using the computer system 700 or a portion therein. In other illustrative embodiments, the computer system may include the media recorder proxy devices 208 and 310 of FIGS. 2-3. Each of the media recorder proxy devices 208 and 310 of FIGS. 2-3 may include or be implemented using the computer system 700 or a portion thereof.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a projection television system, a flat panel display, or a solid state display. Additionally, the computer system 700 may include an input device 712, such as a keyboard, and a cursor control device 714, such as a mouse. The computer system 700 may also include a disk drive unit 716, a signal generation device 718, such as a speaker or remote control, and one or more network interface devices 720 capable of communicating with a network 726. Not all of the components of the computer system 700 of FIG. 7 may be included. For example, some computer systems 700 may not include an input device (e.g., a server may not include an input device).

In a particular embodiment, as depicted in FIG. 7, the disk drive unit 716 may include a computer-readable storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 724, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 724. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the present disclosure may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A device, comprising:
   a processor;
   a memory coupled to the processor, wherein the memory stores instructions executable by the processor to perform operations comprising:
      in response to a request to record a media content item:
         sending a first command to a first media recording device, the first command instructing the first media recording device to generate a first recording of the media content item, the request received from a communication device;

sending a second command to a second media recording device, the second command instructing the second media recording device to generate a second recording of the media content item;

sending a third command to the first media recording device, the third command instructing the first media recording device to delete a first prior recording of a second media content item; and sending a fourth command to the second media recording device, the fourth command instructing the second media recording device to delete a second prior recording of the second media content item.

2. The device of claim 1, wherein the first command instructs the first media recording device to generate the first recording in a first format and the second command instructs the second media recording device to generate the second recording in a second format different from the first format.

3. The device of claim 1, wherein the communication device includes the first media recording device.

4. The device of claim 1, wherein the operations further comprise sending a conflict notification to the communication device in response to the processor detecting a scheduling conflict at the first media recording device.

5. The device of claim 4, wherein the conflict notification identifies a user selectable action to resolve the scheduling conflict, and wherein the operations further comprise:
receiving a selection of the user selectable action from the communication device;
generating a fifth command based on the selection; and
sending the fifth command to the first media recording device.

6. The device of claim 4, wherein the operations further comprise:
generating a fifth command to resolve the scheduling conflict based on a user preference; and
sending the fifth command to the first media recording device.

7. The device of claim 1, wherein the operations further comprise:
prior to sending the second command to the second media recording device, determining that the media content item is inaccessible to the second media recording device; and
instructing the first media recording device to send the first recording to the second media recording device.

8. The device of claim 7, wherein the second command instructs the second media recording device to generate the second recording of the media content item by converting the first recording from a first file format to a second file format.

9. The device of claim 1, wherein the operations further comprise:
identifying a default file format associated with the first media recording device; and
in response to determining the request indicates a particular file format, generating the first command to identify the particular file format.

10. The device of claim 1, wherein the first command and the second command are sent via a network.

11. The device of claim 1, wherein the first command instructs the first media recording device to transmit a second request for the media content item to a content source, and wherein the second command instructs the second media recording device to transmit a third request for the media content item to the content source.

12. The device of claim 1, wherein the third command and fourth command are sent such that the first prior recording and second prior recording are deleted near simultaneously.

13. The device of claim 1, wherein the third command and the fourth command are sent in response to a storage threshold being satisfied by the first media recording device, the second media recording device, or both when the request is received.

14. The device of claim 1, wherein the third command and the fourth command are sent before the first command and the second command.

15. A method comprising:
in response to receiving a request to record a media content item at a proxy device:
sending a first command to a first media recording device from the proxy device, the first command instructing the first media recording device to generate a first recording of the media content item, the request received from a communication device;
sending a second command to a second media recording device from the proxy device, the second command instructing the second media recording device to generate a second recording of the media content item;
sending a third command to the first media recording device from the proxy device, the third command instructing the first media recording device to delete a first prior recording of a second media content item; and
sending a fourth command to the second media recording device from the proxy device, the fourth command instructing the second media recording device to delete a second prior recording of the second media content item.

16. The method of claim 15, wherein the communication device includes the first media recording device.

17. The method of claim 15, wherein the media content item corresponds to an episode of a television program, wherein the first recording includes a first recorded version of the episode of the television program in a first format, and wherein the second recording includes a second recorded version of the episode of the television program in a second format.

18. The method of claim 15, wherein the first command has a priority based on user preferences stored at the proxy device, and wherein the method further comprises:
detecting that a scheduling conflict exists at the first media recording device;
generating an instruction based on the priority; and
sending the instruction to the first media recording device.

19. A computer-readable storage device comprising instructions that, when executed by a processor, cause the processor to perform operations including:
in response to a request to record a media content item:
sending a first command to a first media recording device, the first command instructing the first media recording device to generate a first recording of the media content item, the request received from a communication device;
sending a second command to a second media recording device, the second command instructing the second media recording device to generate a second recording of the media content item;
sending a third command to the first media recording device, the third command instructing the first media recording device to delete a first prior recording of a second media content item; and sending a fourth command to the second media recording device, the fourth command instructing the second media recording device to delete a second prior recording of the second media content item.

20. The computer-readable storage device of claim 19, wherein the media content item is scheduled for recording at the first media recording device based on information in an electronic program guide, and wherein the media content item is scheduled for recording at the second media recording device based on the information in the electronic program guide.

* * * * *